United States Patent
Li et al.

(10) Patent No.: US 11,881,707 B2
(45) Date of Patent: Jan. 23, 2024

(54) REVERSE BIAS PROTECTION CIRCUIT FOR A VEHICLE BATTERY SYSTEM

(71) Applicant: A123 Systems LLC, Waltham, MA (US)

(72) Inventors: Yue Li, Novi, MI (US); Weiwei Lin, Hangzhou (CN); Steve Gierlach, Novi, MI (US); Brian Large, Novi, MI (US); Jiaping Zhang, Hangzhou (CN); Ke Xu, Hangzhou (CN)

(73) Assignee: A123 SYSTEMS LLC, Waltham, MA (US)

( * ) Notice: Subject to any disclaimer, the term of this patent is extended or adjusted under 35 U.S.C. 154(b) by 0 days.

(21) Appl. No.: 17/342,462

(22) Filed: Jun. 8, 2021

(65) Prior Publication Data

US 2021/0384720 A1    Dec. 9, 2021

Related U.S. Application Data

(60) Provisional application No. 63/042,963, filed on Jun. 23, 2020, provisional application No. 63/036,346, filed on Jun. 8, 2020.

(51) Int. Cl.

| | |
|---|---|
| *H02H 7/18* | (2006.01) |
| *B60L 50/60* | (2019.01) |
| *H02H 1/00* | (2006.01) |
| *B60L 58/10* | (2019.01) |
| *H01M 10/42* | (2006.01) |

(52) U.S. Cl.
CPC .............. *H02H 7/18* (2013.01); *B60L 50/66* (2019.02); *B60L 58/10* (2019.02);
(Continued)

(58) Field of Classification Search
CPC ........ B60L 3/0046; B60L 50/66; B60L 58/10; H01M 10/4257; H01M 2010/4271;
(Continued)

(56) References Cited

U.S. PATENT DOCUMENTS

| | | | | |
|---|---|---|---|---|
| 5,539,610 A | * | 7/1996 | Williams | ............. H02H 11/003 |
| | | | | 307/130 |
| 5,642,251 A | * | 6/1997 | Lebbolo | ................. H02H 3/243 |
| | | | | 361/84 |

(Continued)

FOREIGN PATENT DOCUMENTS

| | | | | |
|---|---|---|---|---|
| EP | 2490316 B1 | 10/2013 | | |
| JP | 2005019532 A | 1/2005 | | |
| WO | WO-2012110664 A1 | * | 8/2012 | ........... H02H 11/003 |

OTHER PUBLICATIONS

ISA Korean Intellectual Property Office, International Search Report and Written Opinion Issued in Application No. PCT/US2021/036486, WIPO, dated Sep. 23, 2021, 11 pages.

*Primary Examiner* — Jared Fureman
*Assistant Examiner* — Nicolas Bellido
(74) *Attorney, Agent, or Firm* — McCoy Russell LLP

(57) ABSTRACT

Systems and methods are provided for a battery management system (BMS) having a protection circuit. In one example, a vehicle battery system may include the BMS, the BMS including a cutoff circuit electrically coupled to the protection circuit, and a battery pack, a positive supply line of the battery pack being electrically coupled to the cutoff circuit, wherein the protection circuit may include each of an input electrically coupled to a control input of the cutoff circuit, an output electrically coupled to an output of the cutoff circuit, and a control input of the protection circuit electrically coupled to the output of the cutoff circuit. In some examples, the protection circuit may further include a low-current leakage transistor configured to maintain the cutoff circuit in an OFF state upon detection of a reverse bias voltage. In this way, the protection circuit may mitigate unexpected switching ON of the cutoff circuit.

11 Claims, 5 Drawing Sheets

(52) U.S. Cl.
CPC ...... *H01M 10/4257* (2013.01); *H02H 1/0007* (2013.01); *H01M 2010/4271* (2013.01); *H01M 2220/20* (2013.01)

(58) Field of Classification Search
CPC ........... H01M 2220/20; H01M 50/103; H01M 50/249; H02H 1/0007; H02H 7/18; Y02E 60/10; Y02T 10/70
See application file for complete search history.

(56) References Cited

U.S. PATENT DOCUMENTS

| | | | |
|---|---|---|---|
| 7,283,343 B2 | 10/2007 | Grose et al. | |
| 9,162,639 B2 * | 10/2015 | Kanzaki | B60R 16/033 |
| 10,778,019 B2 * | 9/2020 | Gagnon | H02H 3/18 |
| 11,670,938 B2 * | 6/2023 | Li | H02H 7/18 |
| | | | 429/90 |
| 2007/0268048 A1 * | 11/2007 | Komatsu | H03K 17/0822 |
| | | | 327/143 |
| 2008/0297114 A1 | 12/2008 | Chang et al. | |
| 2011/0134576 A1 | 6/2011 | Clemente et al. | |
| 2013/0229738 A1 * | 9/2013 | Gueltig | H02H 11/003 |
| | | | 361/56 |
| 2019/0027945 A1 | 1/2019 | Gagnon et al. | |
| 2021/0384560 A1 * | 12/2021 | Li | H02H 7/18 |
| 2023/0253780 A1 * | 8/2023 | Li | B60L 50/66 |
| | | | 429/90 |
| 2023/0253781 A1 * | 8/2023 | Li | H01M 50/103 |
| | | | 429/90 |

* cited by examiner

REVERSE BIAS PROTECTION CIRCUIT FOR A VEHICLE BATTERY SYSTEM

CROSS REFERENCE TO RELATED APPLICATIONS

The present application claims priority to each of U.S. Provisional Application No. 63/036,346, entitled "PROTECTION CIRCUIT FOR BATTERY MANAGEMENT SYSTEM" and filed on Jun. 8, 2020, and U.S. Provisional Application No. 63/042,963, entitled "PROTECTION CIRCUIT FOR BATTERY MANAGEMENT SYSTEM" and filed on Jun. 23, 2020. The entire contents of each of the above-identified application are hereby incorporated by reference for all purposes.

FIELD

The present description relates generally to a battery management system including a protection circuit, in particular for a battery pack in a vehicle.

BACKGROUND AND SUMMARY

Lithium-ion secondary (rechargeable) batteries are commonly employed for starting and powering electric and hybrid-electric vehicles. According to power requirements and application, a plurality of lithium-ion batteries may be assembled into a battery pack. For example, a 48V battery pack may be installed in a battery-assisted hybrid vehicle (BAHV) so as to provide power to the BAHV during operations having low engine load, such as coasting, braking, and idling.

During maintenance of the vehicle or replacement of the battery pack, positive and negative leads may be disconnected from the battery pack and then either reconnected thereto or connected to a new battery pack. However, in some circumstances, the positive and negative leads may be reversely connected to terminal posts of a given battery pack. In other circumstances, a negative voltage drop, for example, voltage noise, may appear at a positive terminal post of the battery pack during vehicle operation. In either case, one or more electric power control devices (e.g., metal-oxide-semiconductor field-effect transistors (MOSFETs)) in a battery management system (BMS) of the vehicle may be inadvertently switched on, resulting in a reversed bias of an applied potential difference and unexpectedly discharging the battery pack. Such a reversed bias may degrade one or more of the electric power control devices of the BMS such that the driver electric power control devices may not switch operating states as expected.

Accordingly, protection circuits have been developed to mitigate reverse bias voltage. As one example, a diode may be placed in series with the battery pack so that no current will flow when a reverse bias voltage is applied. However, a forward voltage drop across the diode may limit a voltage available to the driver IC. As another example, an additional MOSFET may be placed in either a power (positive supply) line (between the battery pack and an electrical load in series) or a ground return line (between the electrical load and the battery pack in series), wherein a body diode of the additional MOSFET is oriented in a direction of expected current flow during battery operation. As such, the body diode may provide reverse bias protection when the battery pack is improperly connected/installed by shorting the reverse bias voltage to ground, and the body diode itself may be shorted during desired battery pack operation. However, implementation of the additional MOSFET in a protection circuit may be associated with further control complexity at the driver IC, and may incur correspondingly increased costs. Further, reversed polarity connections may induce higher currents which may be not be manageable by any given MOSFET, thereby leading to less than desirable reverse bias voltage conditions.

The inventors have identified the above issues and have determined solutions to at least partially solve them. In one example, a vehicle battery system is provided, the vehicle battery system including a battery management system (BMS) including a cutoff circuit electrically coupled to a reverse bias protection circuit; and a battery pack having a plurality of stacked battery cells, a positive supply line of the battery pack being electrically coupled to the cutoff circuit, wherein the reverse bias protection circuit includes each of an input electrically coupled to a control input of the cutoff circuit, an output electrically coupled to an output of the cutoff circuit, and a control input electrically coupled to the output of the cutoff circuit. In this way, the vehicle battery system may be protected from reverse bias voltage conditions without costly components or complex control circuits.

In one example, a vehicle battery system is provided having a battery pack coupled to a BMS. Specifically, a positive supply line of the battery pack may be electrically coupled to a drain terminal of a MOSFET included in the BMS. Further, a gate terminal and a source terminal of the MOSFET may be electrically coupled to a reverse bias protection circuit. Accordingly, in a higher-current environment accompanying application of a reverse bias voltage, a gate-source voltage ($V_{GS}$) of the MOSFET may be maintained below a threshold voltage ($V_{th}$) by directing current to a low-current leakage transistor in the reverse bias protection circuit. As such, the reverse bias protection circuit may maintain an OFF state in the MOSFET even upon application of a reverse bias voltage.

In some examples, the $V_{GS}$ of the MOSFET may be maintained near zero by correspondingly regulating a collector-emitter voltage ($V_{CE}$) of the low-current leakage transistor electrically coupled to the MOSFET. Specifically, a Zener diode may further be coupled to each of an emitter terminal and a base terminal of the low-current leakage transistor to increase a base-emitter voltage ($V_{BE}$) thereacross, switching the low-current leakage transistor to an ON state. Once ON, the low-current leakage transistor may effectively control for voltage spikes in the vehicle battery system by maintaining the $V_{CE}$ at a low magnitude.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a protection circuit for a battery pack, for example, a lithium-ion battery pack for powering an electric or hybrid-electric vehicle. The lithium-ion battery pack may include a plurality of lithium-ion battery cells assembled in a stacked configuration. As an example, the lithium-ion battery pack may be a 48V battery pack for starting or providing power to a battery-assisted hybrid vehicle (BAHV). Further, the protection circuit may be included in a battery management system (BMS) coupled to the lithium-ion battery pack.

Specifically, the protection circuit may maintain a cutoff circuit in an OFF state upon application of an unexpected reverse bias voltage, for example, due to a reversed polarity event. The cutoff circuit may include one or more of field-effect transistors (FETs), such as metal-oxide semiconductor FETs (MOSFETs), junction gate FETs (JFETs), etc., other types of transistors, or a combination thereof. In one example, the cutoff circuit may be a single MOSFET. In an additional or alternative example, the protection circuit may include a low-current leakage transistor, such as a bipolar junction transistor (BJT), which may maintain a gate-source voltage ($V_{GS}$) of the MOSFET below a threshold voltage ($V_{th}$) by maintaining a near-zero collector-emitter voltage ($V_{CE}$) when the reverse bias voltage is applied to a source terminal of the MOSFET. In this way, the cutoff circuit, and thereby the BMS and the lithium-ion battery pack, may be protected from voltage spikes incurred by reversed polarity situations, such as due to negative electric noise or positive and negative leads miscoupled to terminal posts of the lithium-ion battery pack.

As used herein, when referring to two components of a circuit, "coupled" may refer to "electrically coupled" unless otherwise specified. Accordingly, when referring to two components of a circuit, "directly coupled" may refer to the two components being electrically coupled without any electrical components (e.g., resistors, transistors, capacitors, etc.) disposed therebetween, excepting an electrical conductor (such as a wire and/or a busbar). In addition, transistors described as being "ON" allow current to flow through the transistors, whereas transistors described as being "OFF" prevent current flow through the transistors.

Figure 1A:
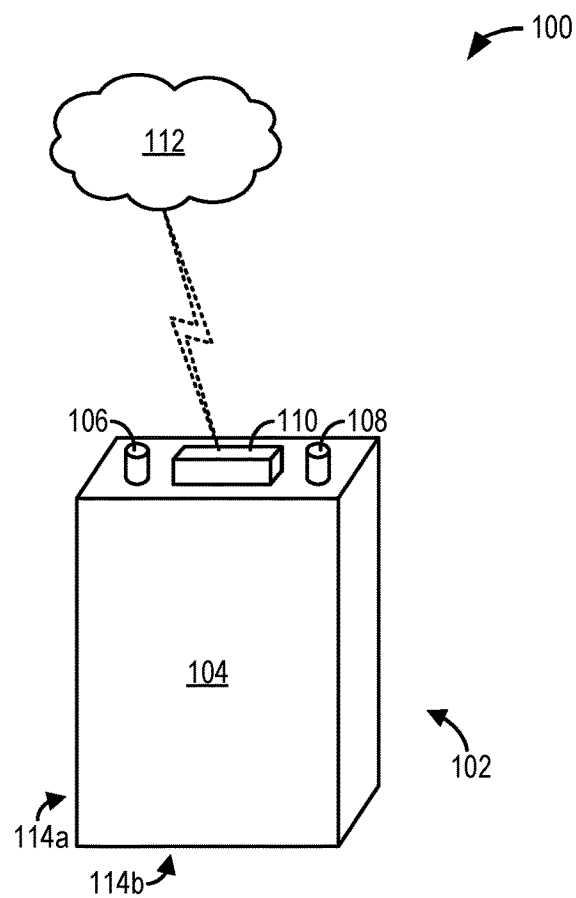
FIG. 1A shows a schematic diagram of an exemplary battery pack assembly.
Figure 1B:
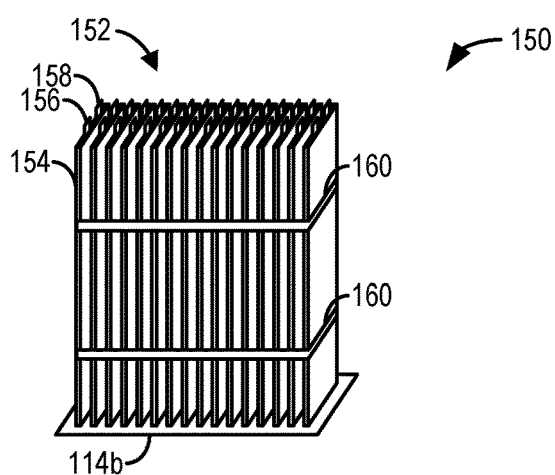
FIG. 1B shows a schematic diagram of the exemplary battery pack assembly with at least a portion of an external housing removed, exposing a plurality of stacked battery cells.

FIG. 1A depicts an exemplary battery pack assembly for a vehicle system. FIG. 1B depicts the battery pack assembly with at least a portion of an external housing thereof removed, such that a battery pack including a plurality of stacked lithium-ion battery cells is exposed. The battery pack may be included in the exemplary vehicle battery system of FIG. 2, where the battery pack may be coupled to a BMS. The BMS may include a protection circuit, exemplary circuitry of which is depicted in FIG. 3. In some examples, the protection circuit may be configured to maintain a cutoff circuit of the BMS in an OFF state when no switch ON request has been received. In additional or alternative examples, the protection circuit may be configured to maintain at least one component of the cutoff circuit in the OFF state even when a switch ON request is received, so that electric current flow from one or more of the plurality of stacked lithium-ion battery cells to an electrical load may be prevented. Accordingly, a method for managing current flow through the cutoff circuit, for example, which may include maintaining the cutoff circuit in the OFF state, is provided in FIG. 4. Example operating sequences of the BMS for managing current flow through the cutoff circuit and the protection circuit are provided in FIG. 5.

Referring now to FIG. 1A, a schematic diagram 100 depicting a battery pack assembly 102 is shown. The battery pack assembly 102 may be configured for starting or powering a vehicle, such as an electric vehicle or a hybrid-electric vehicle. For example, the battery pack assembly 102 may include a 48V battery pack including a plurality of lithium-ion battery cells (as described below in detail with reference to FIG. 1B).

The plurality of lithium-ion battery cells may be arranged in a stacked configuration and removably enclosed within an external housing 104. Accordingly, the external housing 104 may be composed of a material having a low electrical conductivity, such as a plastic or other polymer, so as to reduce shorting events within the vehicle. The external housing 104, depicted in FIG. 1A as a rectangular prism, may be molded to be clearance fit into the vehicle such that the battery pack assembly 102 may be in face-sharing contact with one or more components of the vehicle, such as one or more engine components.

The external housing 104 may further be configured to include openings or cavities for interfacial components of the battery pack assembly 102. For example, the external housing 104 may be configured to expose a positive terminal post 106 and a negative terminal post 108, which may each be a lead-free terminal, for example. That is, the positive terminal post 106 and the negative terminal post 108 may be insert-molded in place on the external housing 104. Within the vehicle, the positive terminal post 106 and the negative terminal post 108 may respectively be electrically coupled to positive and negative leads such that the battery pack assembly 102 may form a closed circuit with an electrical load of the vehicle, such that power may be provided to the vehicle.

The positive terminal post 106 and the negative terminal post 108 may be configured with differing colors, shapes, symbols, etc. so as to indicate which of the terminal posts 106, 108 is positive and which is negative. For example, the positive terminal post 106 may be red and denoted with a plus symbol (+) and the negative terminal post 108 may be black and denoted with a negative symbol (−). Nevertheless, in some circumstances the positive and negative leads may be erroneously miscoupled, such that the positive lead may be coupled to the negative terminal post 108 and the negative lead may be coupled to the positive terminal post 106. In such circumstances, a reversed bias of applied potential difference may result, and the battery pack assembly 102 may unexpectedly discharge absent any protection thereagainst. Accordingly, and as discussed below with reference to FIGS. 2 and 3, the battery pack assembly 102 may include a BMS having a reverse bias protection circuit, where the BMS may be coupled to the plurality of lithium-ion battery cells and the electrical load. In this way, a MOSFET of the BMS may remain switched OFF during application of a reverse bias voltage such that degradation of individual battery cells and the BMS may be mitigated.

In some examples, the external housing 104 may be configured to expose a network management interface 110. In one example, the network management interface 110 may be communicatively coupled to a local interconnect network (LIN) 112 of the vehicle via a wired or wireless connection.

Accordingly, in some examples, the network management interface 110 may include a physical connector for mating with a complementary connector affixed to a wire extending from a LIN bus.

In some examples, the external housing 104 may include a top cover 114a removably affixed to an enclosure base 114b. As such, the top cover 114a may be temporarily removed to replace or diagnose one or more of the plurality of lithium-ion battery cells.

Referring now to FIG. 1B, a schematic diagram 150 depicting a battery pack 152 is shown. In some examples, the battery pack 152 may be included in the battery pack assembly 102 of FIG. 1A, wherein the top cover 114a has been removed from the battery pack assembly 102, exposing a plurality of lithium-ion battery cells 154 removably affixed to the enclosure base 114b. Accordingly, it will be appreciated that each lithium-ion battery cell 154 may represent a fundamental unit from which a battery pack of arbitrary size, arbitrary power, and having an arbitrary number of lithium-ion battery cells 154 may be constructed. It will further be appreciated that other embodiments not depicted at FIG. 1B may include a battery pack having only one lithium-ion battery cell.

In some examples, the plurality of lithium-ion battery cells 154 may be arranged in a stacked configuration, where each of the plurality of lithium-ion battery cells 154 may be a prismatic pouch electrochemical cell. As such, each of the plurality of lithium-ion battery cells 154 may include a positive electrode and a negative electrode immersed in a liquid electrolyte, where each of the positive electrode, negative electrode, and electrolyte may be enclosed by a hermetically-sealed pouch.

Further, each of the plurality of lithium-ion battery cells 154 may expose a positive electrode tab 156 and a negative electrode tab 158, which may be configured to couple to the positive electrode and the negative electrode, respectively. Accordingly, each of the plurality of lithium-ion battery cells 154 may be electrically coupled to the positive terminal post 106 and the negative terminal post 108 described in detail above with reference to FIG. 1A. In some examples, the plurality of lithium-ion battery cells 154 may be electrically coupled to one another in series and/or in parallel by one or more busbars (not shown at FIG. 1B), whereby the one or more busbars may each be electrically coupled to a plurality of electrode tabs 156, 158 on multiple lithium-ion battery cells 154. The one or more busbars may further be electrically coupled to one of the terminal posts 106, 108, such that the plurality of lithium-ion battery cells 154 may be electrically coupled to the terminal posts 106, 108 and thereby provide power to a system, for example, a vehicle.

Each lithium-ion battery cell 154 of the battery pack 152 may be identical to one another. Further, each of a total number of lithium-ion battery cells 154 and an electrical coupling configuration (e.g., parallel count and series count) of the battery pack 152 may define electrical characteristics and performance ratings thereof. As an example, the battery pack 152 may be configured in a '4S4P' configuration which has 16 lithium-ion battery cells 154 in four subgroups, where the subgroups may be electrically coupled in series, and where four lithium-ion battery cells 154 in each subgroup may be electrically coupled in parallel. In some examples, the total number of lithium-ion battery cells 154 may be odd. In other examples, the total number of lithium-ion battery cells 154 may be even.

The plurality of lithium-ion battery cells 154 may be retained in the stacked configuration by bands 160. As shown, one or more bands 160 may circumscribe the plurality of lithium-ion battery cells 154 so as to prevent displacement of individual lithium-ion battery cells 154 relative to one another.

Figure 2:
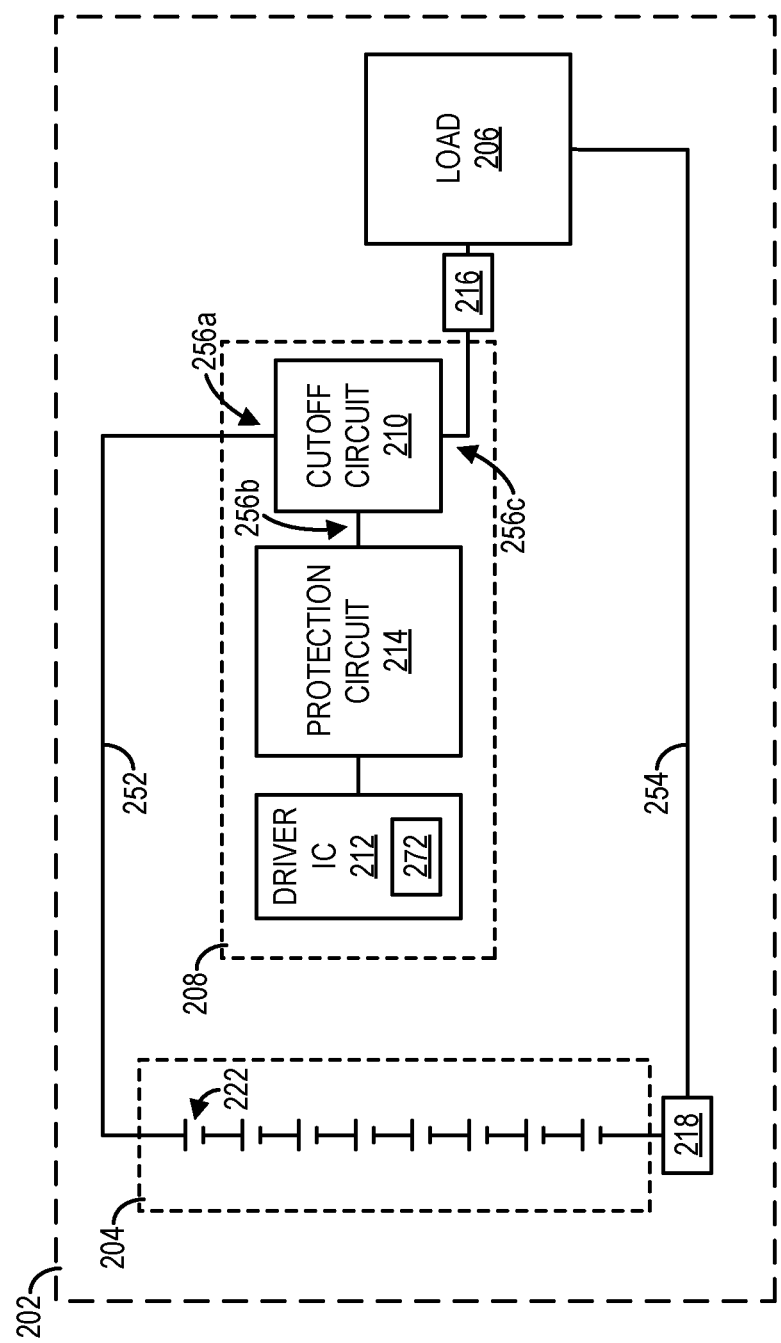
FIG. 2 shows a high-level block diagram of a vehicle battery system including a battery management system.
Figure 3:
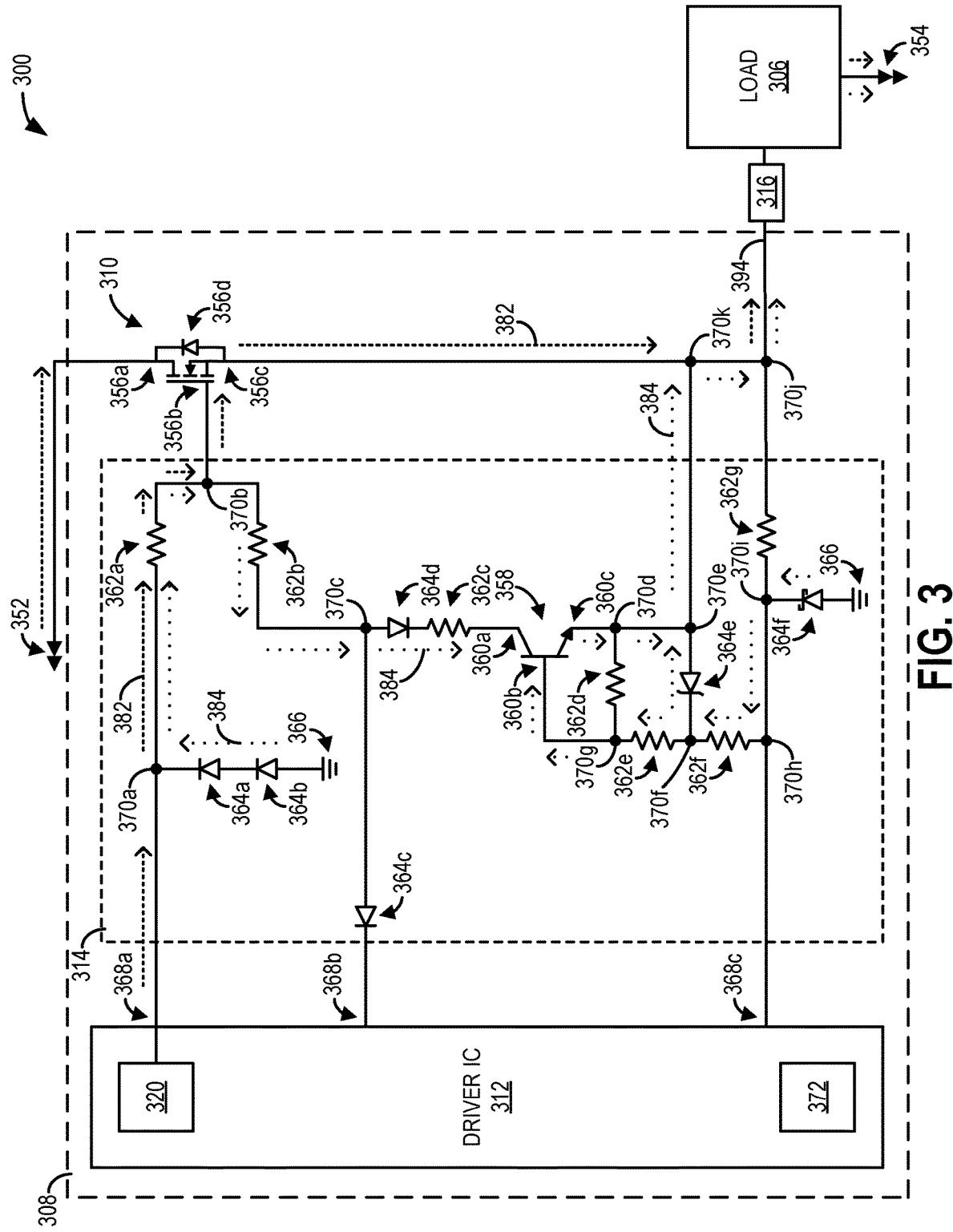
FIG. 3 shows a schematic diagram of circuitry of a protection circuit included in the battery management system.

Referring now to FIG. 2, a high-level block diagram 200 depicting a vehicle battery system 202 is shown. The vehicle battery system 202 may include a battery pack 204 (such as the battery pack 152 of FIG. 1B), the battery pack 204 including one or more lithium-ion battery cells 222. As shown, a positive supply line 252 may couple a positive end of the battery pack 204 to an electrical load 206 (for example, a belt integrated starter/generator, an integrated starter/generator, etc.) via a BMS 208, and a ground return line 254 may couple the electrical load 206 to a negative end of the battery pack 204. Specifically, the positive supply line 252 of the battery pack 204 may be coupled to an input 256a of a cutoff circuit 210, and an output 256c of the cutoff circuit 210 may be coupled to the electrical load 206. Further, a control input 256b of the cutoff circuit 210 may be coupled to a driver integrated circuit (IC) 212 of the BMS 208 via a protection circuit 214. Accordingly, the driver IC 212 may be communicably coupled to a controller 272, which may store machine readable instructions on a non-transitory storage device, the instructions executable by the controller 272 to enable various functionalities of the BMS 208, such as receiving and transmitting switching requests, monitoring the vehicle battery system 202, etc. It will be appreciated that, though the controller 272 is depicted in FIG. 2 as being included within the driver IC 212, in other examples, the controller 272 may be positioned external to the driver IC 212. As further shown, a positive terminal post 216 may be coupled to a line coupling the BMS 208 to the electrical load 206 and a negative terminal post 218 may be coupled to a line (the ground return line 254) coupling the electrical load 206 to the battery pack 204 [additionally or alternatively, the positive and negative terminal posts 216, 218 may be coupled to the BMS 208 via respective busbars (not shown at FIG. 2)]. Accordingly, it will be appreciated that the electrical load 206 may be located external to the battery pack 204.

The cutoff circuit 210 may be coupled to other components in the vehicle battery system 202 via the input 256a, the control input 256b, and the output 256c. As such, a voltage at the control input 256b relative to a voltage at the output 256c may control an operating state of the cutoff circuit 210. For example, if a relative voltage across the control input 256b and the output 256c is less than a threshold operating voltage, then the cutoff circuit 210 may be in an OFF state. Conversely, if the relative voltage across the control input 256b and the output 256c is greater than or equal to a threshold operating voltage, then the cutoff circuit 210 may be in an ON state. In this way, the cutoff circuit 210 may operate as a switch to selectively permit current flow from the input 256a to the output 256c depending on a voltage applied to the control input 256b.

The cutoff circuit 210 may include one or more of FETs, such as MOSFETs or JFETs, other types of transistors, or combinations thereof. In some examples, the cutoff circuit 210 may be a single MOSFET, such as an n-channel enhancement mode MOSFET, a p-channel enhancement mode MOSFET, etc. In such examples, the input 256a may be a drain terminal, the control input 256b may be a gate terminal, and the output 256c may be a source terminal. Accordingly, as an exemplary embodiment, operation of the cutoff circuit 210 may be described hereinbelow as operation of a MOSFET 210 having a drain terminal 256a, a gate terminal 256b, and a source terminal 256c.

Specifically, the MOSFET 210 may be in an OFF state at zero gate-source voltage ($V_{GS}$). Thus, switching the MOSFET 210 to an ON state may depend upon a voltage at the gate terminal 256b ($V_G$) relative to a voltage at the source terminal 256c ($V_S$), that is, the $V_{GS}$. If the $V_{GS}$ is higher than a $V_{th}$ of the MOSFET 210, then the MOSFET 210 may switch from the OFF state to the ON state. When in the ON state, the MOSFET 210 may permit current flow from the drain terminal 256a to the source terminal 256c. Conversely, when in the OFF state, the MOSFET 210 may prevent current flow therethrough.

During battery operation, a switch ON request may be received by the driver IC 212, and the $V_{GS}$ (greater than the $V_{th}$) may be output to switch the MOSFET 210 to the ON state. However, in some circumstances, the MOSFET 210 may be unintentionally switched from an OFF state to an ON state without any feedback from the driver IC 212. For example, a higher-current or short-circuit voltage profile may be generated by a reversed polarity event, by negative electric noise in the vehicle battery system 202, etc.

Specifically, an unintentional switching of the MOSFET 210 may result from any event which would generate a significant negative $V_S$, as a negative $V_S$ may result in a positive $V_{GS}$, as implied by equation (1):

$$V_{GS} = V_G - V_S \qquad (1)$$

As just one example, if the $V_G$ is zero and the $V_S$ is a negative value, then the $V_{GS}$ is a positive value, and if the positive value of the $V_{GS}$ is greater than the $V_{th}$, then the MOSFET 210 may turn ON.

Accordingly, a protection circuit to maintain a MOSFET in an OFF state during an unexpected voltage spike in the vehicle battery system is provided herein. For example, the protection circuit 214 may be included in the BMS 208 to protect the MOSFET 210 from unintentional switch ON by dissipating energy accumulated in the vehicle battery system 202 during a short-circuit or higher-current situation. Accordingly, the protection circuit 214 may control the gate terminal 256b and the source terminal 256c of MOSFET 210 by maintaining the $V_G$ and the $V_S$ near, or substantially at, zero, such that a magnitude of the $V_{GS}$ may be maintained at a low value and may not exceed the $V_{th}$ ("substantially" may be used herein as a qualifier meaning "effectively").

For a circuit that does not include a reverse bias protection circuit described herein, current at a charge pump included in the driver IC 212 may bleed out to compensate leakage current at the MOSFET 210 during reverse bias conditions. Accordingly, the vehicle battery system 202 may lose built-up charge at the charge pump, such that the driver IC 212 may not be able to effectively supply current to various parts of the vehicle battery system 202 (for example, to switch ON the MOSFET 210 when a switch ON request is actually received). Thus, when a sudden negative $V_S$ is generated at the MOSFET 210, current draining from the charge pump may be undesirably exacerbated.

In contrast, in the present disclosure, the protection circuit 214 prevents the charge pump from bleeding out once negative $V_S$ is detected above a threshold $V_S$. Specifically, and as discussed below in detail with reference to FIG. 3, a current path may be provided in the protection circuit 214 via a pair of diodes in series to allow current to flow to the gate terminal 256b of the MOSFET 210.

To maintain the $V_{GS}$ less than the $V_{th}$, the protection circuit 214 may further include a switchable current path arranged between the gate terminal 256b and the source terminal 256c. The switchable current path may include a transistor or switching device, such as a BJT, which may, responsive to detecting an unexpected negative $V_S$, maintain down the $V_{GS}$ at the MOSFET 210 to maintain the MOSFET 210 in the OFF state. Thus, by reducing current drain at the charge pump and preventing the MOSFET 210 from turning ON absent any switch ON request, the protection circuit 214 may mitigate degradation of the BMS 208 and the one or more lithium-ion battery cells 220 in the battery pack 204, thereby allowing the BMS 208 to continue expected functionality, such as protecting the battery pack 204 from deep discharge.

In this way, the BMS 208 may be configured to flow current through the switchable current path of the protection circuit 214 upon detection of the reverse bias voltage at the output 256c of the cutoff circuit 210 (e.g., at the source terminal 256c of the MOSFET 210). The BMS 208 may further be configured to prevent current flow through the switchable current path in response to an absence of the reverse bias voltage at the output 256c of the cutoff circuit 210 (e.g., at the source terminal 256c of the MOSFET 210).

It will be appreciated that, though a single MOSFET 210 is depicted at FIG. 2, the BMS 208 may include an array of MOSFETs. Accordingly, aspects of the present disclosure may be applied to each MOSFET in the array of MOSFETs, such that each MOSFET in the array of MOSFETs may be protected from unexpected switch ON.

Referring now to FIG. 3, a schematic diagram 300 depicting circuitry of one example of a reverse bias protection circuit 314 (also referred to herein as protection circuit 314) included in a BMS 308 is shown. In some examples, one or more components described with reference to FIG. 3 may be substituted into the vehicle battery system 202 described above with reference to FIG. 2. For example, the BMS 208 of FIG. 2 and the BMS 308 of FIG. 3 may be the same or equivalent circuits. The component numbers in the circuit of FIG. 3 are made to conform with their incorporation into FIG. 3.

As shown in FIG. 3, the BMS 308 may further include a cutoff circuit 310 (e.g., MOSFET or other known transistor) and a driver IC 312, each being coupled to the protection circuit 314. The MOSFET 310 may include a drain terminal 356a (input), a gate terminal 356b (control input, which may control the operating state of MOSFET 310), and a source terminal 356c (output). The drain terminal or input 356a may be directly coupled to a positive terminal of a battery pack (not shown in FIG. 3) via a positive supply line 352. The gate terminal or control input 356b may be coupled to the driver IC 312 by way of the protection circuit 314. The source terminal or output 356c may be directly coupled to the protection circuit 314. The source terminal 356c may further be directly coupled to a positive battery output terminal 316, and terminal 316 is directly coupled to an (external) electrical load 306. The electrical load 306 may also be directly coupled to a negative battery output terminal of the battery pack via a ground return line 354. It will be appreciated that the electrical load 306 may be located external to the battery pack (that is, the electrical load 306 may not be part of the battery pack). As further shown, various junctions of two or more electrical conductors or wires may be respectively represented by nodes 370a, 370b, 370c, 370d, 370e, 370f, 370g, 370h, 370i, 370j, and 370k. Dashed directional arrows 382 depict exemplary current flow during expected switching ON of the MOSFET 310 during normal circuit operation, as described hereinbelow. That is, the directional arrows 382 depict exemplary current flow when the MOSFET 310 is in an ON state and a low-current leakage transistor 358 of the protection circuit 314 is in the OFF state when reverse bias at terminal 316 is not present.

The MOSFET 310 may further include a body diode 356d. In some circumstances, for example, during a reversed polarity event or when significant negative electric noise has built up in the battery system and the protection circuit 314 is not present, a reverse bias voltage may be applied across the body diode 356d when the MOSFET 310 is in an OFF state. The body diode 356d may then be triggered, unexpectedly switching the MOSFET 310 from the OFF state to an ON state.

During such events where the reverse bias voltage is applied and the protection circuit 314 is not present, a higher-current profile may develop in the battery system. Accordingly, a significant amount of energy may accumulate, and the accumulated energy may dissipate via a weakest (that is, least resistant) channel in the battery system. For example, absent the protection circuit 314, a higher current may pass through the body diode 356d to ground, thus overloading the MOSFET 310. Thus, the protection circuit 314 is provided herein for controlling such higher currents. As discussed in detail below, and as exemplified above with reference to FIG. 2, the protection circuit 314 may protect MOSFET 310 from the reverse bias voltage by maintaining each of a $V_G$ and a $V_S$ of the MOSFET 310 near, or substantially at, 0 V. Accordingly, dotted directional arrows 384 depict exemplary current flow during reverse bias voltage conditions, wherein current may be redirected through the protection circuit 314, as described hereinbelow. That is, the directional arrows 384 depict exemplary current flow when the MOSFET 310 is in an OFF state and the low-current leakage transistor 358 of the protection circuit 314 is in the ON state. Thus, a current path is shown beginning at ground 366 and it passes through diodes 364a and 364b, through resistors 362a and 362b, through diode 364d, through resistor 362c, through transistor 358, through node 370e, and ending at the electrical load 306.

As shown, the driver IC 312 may be provided with three pins 368a, 368b, and 368c, such that timing of outputs therefrom may be varied. Specifically, the pin 368a may be employed to turn ON the MOSFET 310, the pin 368b may be employed to turn OFF the MOSFET 310, and the pin 368c may be employed as a reference pin for controlling a $V_{GS}$ of the MOSFET 310. As such, the pin 368a may provide a voltage (for example, 5 V) that may be delivered to the gate terminal 356b of the MOSFET 310 to switch the MOSFET 310 ON, the pin 368b may pull the $V_G$ to ground, and the pin 368c may be coupled to the source terminal 356c of the MOSFET 310 to reference the $V_S$. In some examples, a switching mechanism of the pin 368a may be slower than a switching mechanism of the 368b. That is, a resistance of a resistor 362a coupling between the pin 368a and the MOSFET 310 may be higher than a resistance of a resistor 362b coupling between the pin 368b and the MOSFET 310.

Absent the protection circuit 314, when significant negative $V_S$ is applied, the $V_{GS}$ may increase to a positive value above a $V_{th}$ of the MOSFET 310. However, the protection circuit 314 may protect the MOSFET 310 by maintaining the $V_G$ and the $V_S$ near, or substantially at, 0 V, thereby maintaining an OFF state of the MOSFET 310. Two principal features of the protection circuit 314 may be provided to protect various components of the BMS 308, and thereby of the battery system as a whole: diodes 364a, 364b, and 364f to feed current from ground 366, and the low-current leakage transistor 358 to maintain the $V_{GS}$ of the MOSFET 310 below the $V_{th}$ (as shown by the directional arrows 384).

For example, when the reverse bias voltage is applied, the diode 364f may prevent excess current from draining from the pin 368c to the source terminal 356c of the MOSFET 310 via a resistor 362g coupled therebetween. Specifically, the current may instead be fed from ground 366 via the diode 364f, as shown by the directional arrows 384. As shown, in some examples, the diode 364f may be a Schottky diode, as Schottky diodes may have a relatively low forward voltage drop, such that the diode 364f may be closer to ground 366. Further, configuring the diode 364f to be oriented as shown may block current from flowing back to ground 366 when the MOSFET 310 controllably switched to the ON state. Additionally, resistors 362f and 362g may be provided in parallel to limit current flow from the pin 368c, maintaining a voltage of the pin 368c near zero when the negative $V_S$ is detected and near a reference value during expected battery operation. When the MOSFET 310 is OFF, due to the inductive feature of the electrical load 306, current may continue to flow through terminal 316 to the electrical load 306. Accordingly, the node 370j may have a negative voltage. In order to sustain the current flow to the electrical load 306 and not drain current from the pin 368c, the diode 364f and the node 370i are provided to form a new circuit path to provide the current to the electrical load 306.

Similarly, and as further shown, the diodes 364a and 364b may be coupled in series to prevent excess current from draining from the charge pump 320 within the driver IC 312 to the gate terminal 356b of the MOSFET 310 via the pin 368a and the resistor 362a coupled therebetween. Specifically, a current may instead be fed from ground 366 via the diodes 364a and 364b when a negative $V_S$ is unexpectedly detected, as shown by the directional arrows 384. As such, the diodes 364a and 364b may be low-leakage diodes, providing low leakage current during unexpected battery operation. In this way, a controllability of the battery system by the driver IC 312, and thereby the BMS 308, may be protected. Further, configuring the diodes 364a and 364b to be oriented as shown may block current from flowing back to ground 366 when the current is provided by the charge pump 320 in response to a switch ON request at the driver IC 312, as shown by the directional arrows 382.

In some examples, and as further shown, the driver IC 312 may be communicably coupled to a controller 372, which may store machine readable instructions on a non-transitory storage device, the instructions executable by the controller 372 to enable various functionalities of the BMS 308, such as receiving and transmitting switching requests, monitoring the battery system, etc. It will be appreciated that, though the controller 372 is depicted in FIG. 3 as being included within the driver IC 312, in other examples, the controller 372 may be positioned external to the driver IC 312.

When a reverse bias voltage, that is, a negative $V_S$, is detected at the source terminal 356c of the MOSFET 310, a generated current may be fed towards node 370f and the low-current leakage transistor 358 from ground 366 through the diode 364f (for example, via the resistor 362f). In some examples, the diode 364e may be a Zener diode or a transient-voltage suppression (TVS) diode, such that the diode 364e may clamp a voltage thereacross at a set value, such as 8.5 V.

In some examples, the low-current leakage transistor 358 may be a BJT including an input (e.g., collector) terminal 360a, a control input (e.g., base) terminal 360b, and an output (e.g., emitter) terminal 360c. A voltage of approximately 8.5 volts relative to the source voltage $V_S$ may be generated at node 370f via diode 364e, this voltage may be lowered via a voltage divider formed by resistors 362e and 362d allowing current to flow into the base terminal 360b, thereby switching transistor 358 from an OFF state to an ON state.

As shown, an anode of the diode 364e may be coupled to the emitter terminal 360c and a cathode of the diode 364e may be directly coupled to the node 370f. As such, the anode of the diode 364e may be a higher voltage than that of the emitter terminal 360c, and the diode 364e may function to stabilize a base-emitter voltage ($V_{BE}$) of the low-current leakage transistor 358.

Accordingly, when the negative $V_S$ is unexpectedly generated, the low-current leakage transistor 358 may switch ON via the negative $V_S$ increasing the $V_{BE}$ thereof. Thus, the low-current leakage transistor 358 may be considered a switch that allows current to flow from diodes 364a and 364b toward the source terminal 356c as indicated by the directional arrows 384. The current may flow through resistor 362a to resistor 362b, then to diode 364d, then to resistor 362c, then through transistor 358 before reaching node 370k, which is directly coupled to the source terminal 356c. The current flow allows $V_G$ to approach $V_S$, thereby preventing MOSFET 310 from switching ON.

Specifically, once the low-current leakage transistor 358 is ON, the $V_G$ of the MOSFET 310 may be quickly dragged down to an emitter voltage ($V_E$) of the low-current leakage transistor 358. Since the emitter terminal 360c may be coupled to the source terminal 356c of the MOSFET 310, the $V_{GS}$ of the MOSFET 310 may be maintained via a $V_{CE}$ of the low-current leakage transistor 358. Accordingly, when the $V_{CE}$ drops across the collector terminal 360a and the emitter terminal 360c, for example, to less than 1 V, the $V_{GS}$ may be maintained at a value less than the $V_{th}$, and the MOSFET 310 may remain in the OFF state.

On the other hand, during expected battery operation, the low-current leakage transistor 358 may be switched OFF, and the pin 368a may supply voltage to raise $V_G$ of the MOSFET 310 to switch MOSFET 310 ON. Electric current may flow from the drain terminal 356a to the source terminal 356c and to the electrical load 306 when MOSFET 310 is switched ON. MOSFET 310 may be switched OFF via pin 368b. Electric current flow from the drain terminal 356a to the source terminal 356c may be prevented when MOSFET 310 is switched to ON. In this way, a switchable current path including the low-current leakage transistor 358 may be electrically coupled to the MOSFET 310, the switchable current path being arranged between the gate terminal 356b of the MOSFET 310 and the source terminal 356c of the MOSFET 310.

In some examples, diodes 364c and 364d may further be provided as blocking diodes to maintain a direction of current flow to the driver IC 312 via the pin 368b and to the low-current leakage transistor 358 via the resistor 362c, respectively. Accordingly, and as shown, the diode 364c may be oriented in a desired direction of current being passed to the driver IC 312 via the pin 368b when the MOSFET 310 is controllably switched OFF, and the diode 364d may be oriented in a desired direction of current being passed to the low-current leakage transistor 358 via the resistor 362c to protect the MOSFET 310 from an unexpected reverse bias voltage passed to the source terminal 356c. In one example, each of the diodes 364c and 364d may be a diode with a relatively low forward voltage drop, such as a Schottky diode.

In this way, a current may flow from the nodes 370b and 370c coupled to the gate terminal 356b of the MOSFET 310 to the nodes 370d and 370e coupled to the source terminal 356c of the MOSFET 310 in response to a negative $V_S$ being applied to the node 370e while current flow across the gate terminal 356b to the source terminal 356c is prevented. Thus, a negative voltage at the source terminal 356c may prevent the MOSFET 310 from turning ON. Such current flow may be enabled by activating the low-current leakage transistor 358 disposed between the nodes 370b and 370c and the nodes 370d and 370e. In some examples, the current may flow from ground 366 through the diodes 364a and 364b to the nodes 370b and 370c. However, the current may not flow from the nodes 370b and 370c to the nodes 370d and 370e in response to an absence of the negative $V_S$ being applied to the node 370e. As shown by the directional arrows 382 and 384, whether the MOSFET 310 is switched ON or switched OFF in response to the negative $V_S$ being applied to the node 370e, the current may pass along a line 394 and across each of the terminal 316 and the electrical load 306 to the ground return line 354.

In some examples, the circuitry depicted by schematic diagram 300 may be implemented in a vehicle battery system to prevent turn ON of the MOSFET 310 even when a switch ON request is received. As an example, the MOSFET 310 may be one of a plurality of MOSFETs arranged in an array. Each of the MOSFETs 310 may be electrically coupled to one of a plurality of lithium-ion battery cells in the battery pack. In some examples, when a switch ON request is received, a portion of the lithium-ion battery cells may be utilized to provide power to the vehicle battery system, and a remaining portion may be kept OFF by the protection circuit 314.

Figure 4:
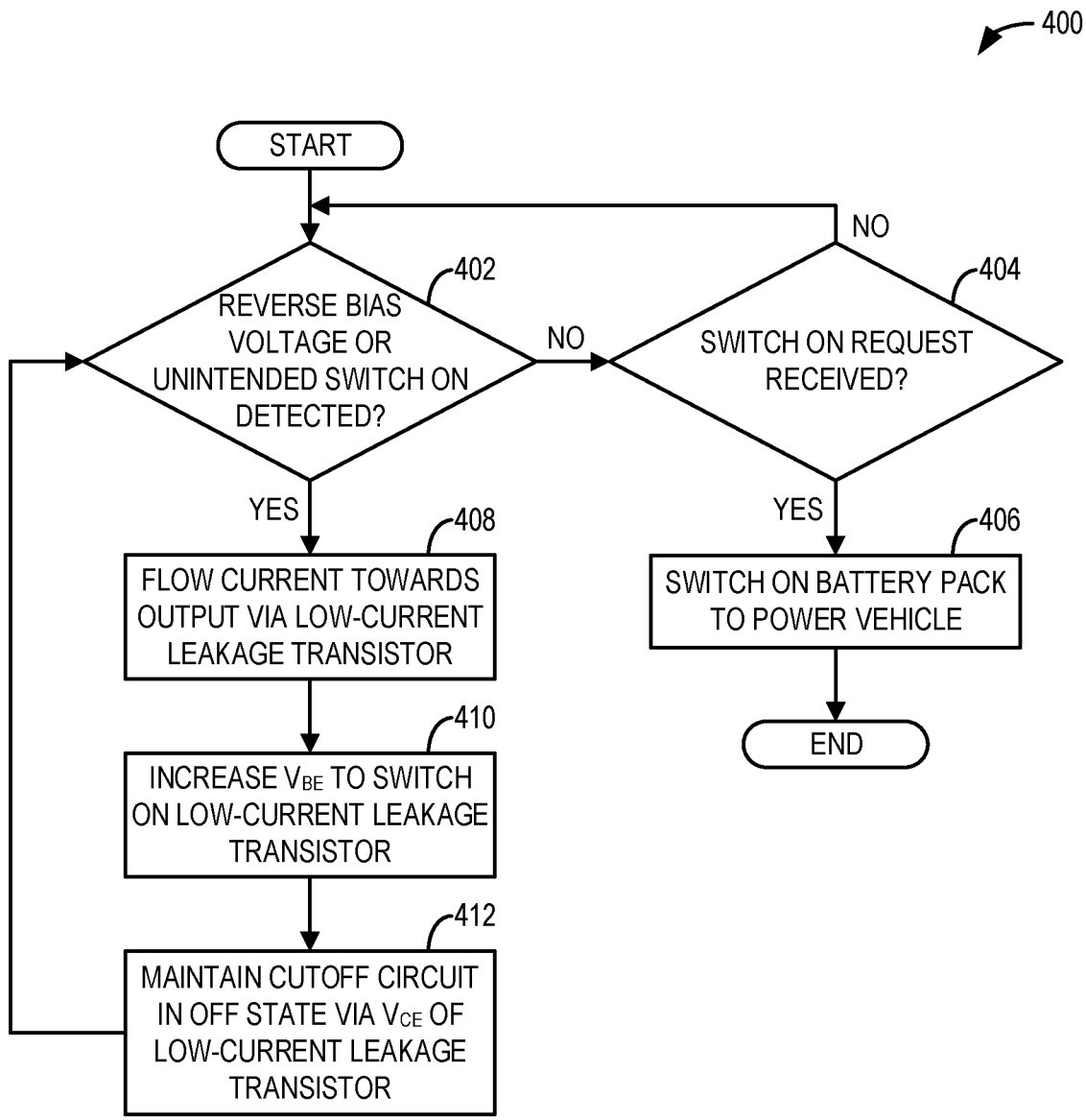
FIG. 4 shows a flow chart of a method for managing current flow through a cutoff circuit during a reverse bias voltage condition.

Referring now to FIG. 4, a flow chart depicting a method 400 for providing reverse bias protection to a battery cutoff is shown. The reverse bias protection may be provided via the circuitry illustrated in FIGS. 2 and 3. In general, during application of a reverse bias voltage in a vehicle battery system, such as due to an unintentional reversed polarity event or built-up negative electric noise, the cutoff circuit may be at risk of unintentional switch-on. In specific examples where the cutoff circuit is a MOSFET, if a $V_{GS}$ of the MOSFET increases above a $V_{th}$ of the MOSFET (for example, via a sufficiently negative $V_S$), then the MOSFET may unintentionally switch ON, potentially discharging and degrading the vehicle battery system.

Method 400 is described below with regard to the systems and components depicted in FIGS. 1A-3. For example, in some examples, method 400 may be implemented in the BMS 208 of FIG. 2 or the BMS 308 of FIG. 3. In such examples, steps of method 400, or a portion thereof, may represent actions taken via hardware devices, such as one or more components of the BMS 208 or the BMS 308, in the physical world. It will be appreciated that method 400 may be implemented with other systems and components without departing from the scope of the present disclosure. It will further be appreciated that individual steps discussed with reference to method 400 may be added, removed, substituted, or interchanged within the scope of the present disclosure.

Method 400 may begin at 402 of FIG. 4, where method 400 may include responding to detection of a reverse bias voltage at a positive battery terminal or to unintended switch ON of the cutoff circuit. If the reverse bias voltage or unintended switch ON is not detected, desired battery operation may proceed. Specifically, method 400 may proceed to 404, where method 400 may include determining whether a switch ON request is received at the driver IC or at a controller coupled to the driver IC. Specifically, the switch ON request may be a command to switch the cutoff circuit of the BMS from an OFF state to an ON state. If the switch ON request is not received, method 400 may return to 402.

If the switch ON request is received, method 400 may proceed to 406, where method 400 may include turning ON a battery pack to power a vehicle by switching ON the cutoff circuit of the BMS and closing a battery circuit of the vehicle battery system. Specifically, a positive supply line may provide power from the battery pack to an (external) electrical load of the vehicle. However, it will be appreciated that the reverse bias protection circuit may mitigate degradation to the vehicle battery system even when the switch ON request is received, for example, when negative electric noise builds up in the vehicle battery system. Method 400 may then end.

Return to 402, if the reverse bias voltage or unintended switch ON is detected, protection of battery operation may proceed. In particular, the reverse bias protection circuit may prevent the cutoff circuit from coupling the battery cells to the electrical load, thereby mitigating degradation to the vehicle battery system.

Method 400 may proceed to 408, where method 400 may include feeding a current (e.g., from ground) towards the output of the cutoff circuit via a low-current leakage transistor in the reverse bias protection circuit. In some examples, the low-current leakage transistor may be a BJT and the cutoff circuit may be a MOSFET, such that a collector terminal thereof may be coupled to a gate terminal (control input) of the MOSFET and an emitter terminal thereof may be coupled to the source terminal (output) of the MOSFET. The emitter terminal of the low-current leakage transistor may further be coupled to an anode of a Zener diode, and a base terminal of the low-current leakage transistor may be coupled to a cathode of the Zener diode. In other examples, a TVS diode may be employed.

At 410, method 400 may include increasing a $V_{BE}$ of the low-current leakage transistor via the Zener diode to switch ON the low-current leakage transistor. Further, by respectively coupling the cathode and the anode of the Zener diode to the base terminal and the emitter terminal of the low-current leakage transistor, the $V_{BE}$ may be clamped to a set value, for example, less than 8.5 V.

At 412, method 400 may include maintaining the cutoff circuit in the OFF state via reducing a $V_{CE}$ of the low-current leakage transistor. Specifically, once the low-current leakage transistor is switched ON, a voltage across the collector and emitter terminals (that is, the $V_{CE}$) may decrease to and be maintained at a low value, for example, less than 1 V. Accordingly, by coupling the control input of the cutoff circuit to the collector terminal of the low-current leakage transistor and the output of the cutoff circuit to the emitter terminal of the low-current leakage transistor, a voltage difference between the control input of the cutoff circuit and the output of the cutoff circuit may be correspondingly maintained. In examples wherein the cutoff circuit is a MOSFET, the gate terminal of the MOSFET may be coupled to the collector terminal of the low-current leakage transistor, and the source terminal of the MOSFET may be coupled to the emitter terminal of the low-current leakage transistor. The $V_{GS}$ may be maintained via activating a transistor. In this way, the $V_{GS}$ may be maintained below a $V_{th}$ of the MOSFET, such that the MOSFET may be maintained in the OFF state. Method 400 may then return to 402.

Figure 5:
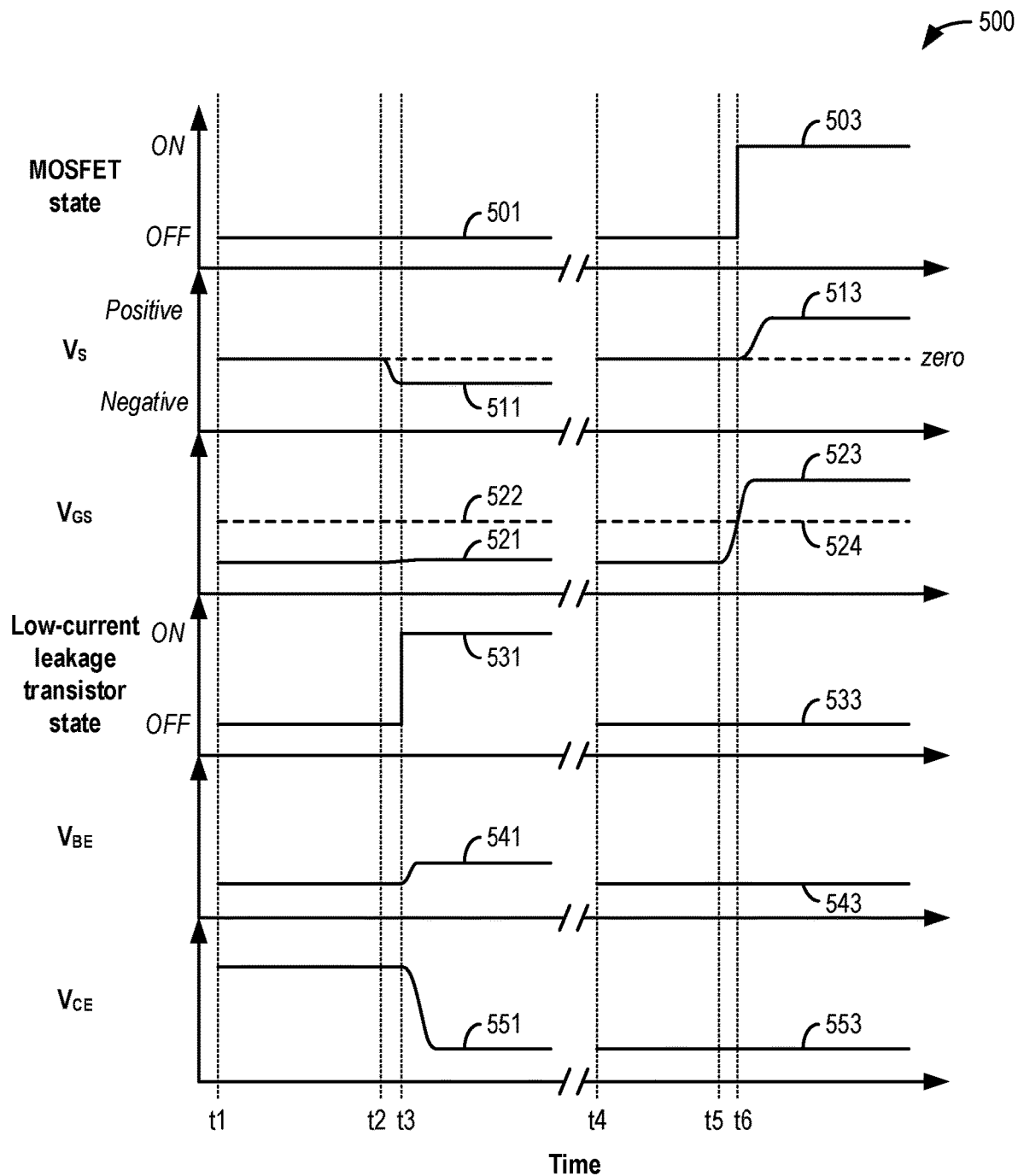
FIG. 5 shows example operating sequences for the BMS.

Referring now to FIG. 5, a timeline 500 depicting two example operating sequences of the vehicle battery system of FIGS. 1A-3 is shown. Specifically, the vehicle battery system may be configured with one or more cutoff circuits, such as one or more MOSFETs, coupled to one or more protection circuits. A given cutoff circuit may switch ON responsive to a switch ON request received by the vehicle battery system, which may allow current to flow through the given cutoff circuit to power a vehicle in which the vehicle battery system may be implemented. However, in some examples, the given cutoff circuit may be in an OFF state when a reverse bias voltage is applied to an output of the given cutoff circuit. In such examples, a protection circuit coupled to the given cutoff circuit may include a low-current leakage transistor, such as a bipolar junction transistor (BJT). When switched ON, the low-current leakage transistor may be configured to maintain a voltage applied across a control input and an output of the given cutoff circuit such that the given cutoff circuit is not unintentionally switched ON. In this way, the protection circuit may mitigate degradation to the vehicle battery system by reducing a possibility of unintentional activation of the cutoff circuitry. In some examples, the vehicle battery system may include the BMS 208 or the BMS 308 respectively described above with reference to FIGS. 2 and 3.

Timeline 500 depicts a cutoff circuit state at solid curves 501 and 503, a voltage applied to the output (e.g., source) of the cutoff circuit at solid curves 511 and 513, a voltage difference between the control input of the cutoff circuit and the output of the cutoff circuit at solid curves 521 and 523, a low-current leakage transistor state at solid curves 531 and 533, a $V_{BE}$ of the low-current leakage transistor at solid curves 541 and 543, and a $V_{CE}$ of the low-current leakage transistor at solid curves 551 and 553. Additionally, dashed curves 522 and 524 represent a first threshold voltage for the voltage applied across the control input and the output at which the cutoff circuit state may switch between an OFF state and an ON state. It will be appreciated that, when the cutoff circuit includes a MOSFET, the voltage applied to the output (curves 511 and 513) may be a $V_S$ of the MOSFET, the voltage difference across the control input and the output (curves 521 and 523) may be a $V_{GS}$ of the MOSFET, and the first threshold voltage (curves 522 and 524) may be a $V_{th}$ of the MOSFET.

All curves are depicted over time and plotted along an abscissa, where time increases from left to right of the abscissa. Further, a dependent variable represented by each curve discussed above is plotted along a respective ordinate, where the dependent variable increases from bottom to top of the given ordinate (unless otherwise stated or shown).

At t1, a first example operating sequence of the vehicle battery system may begin. Between t1 and t2, each of the cutoff circuit state (curve 501) and the low-current leakage transistor state (curve 531) may be in an OFF state. At t2, a negative voltage may be detected at the output of the cutoff circuit (curve 511), for example, due to a reverse bias voltage condition. In response to the negative voltage being detected at the output, a current may be redirected to a Zener diode (or a TVS diode) coupled to the low-current leakage transistor.

At t3, the low-current leakage transistor may switch from the OFF state to the ON state (curve 531). The current may thus flow through the low-current leakage transistor instead of the cutoff circuit, as the low-current leakage transistor may be coupled to a current path of lower resistance than the cutoff circuit.

Accordingly, after t3, the $V_{CE}$ may decrease significantly from a first value to a second value and then be maintained at the second value (curve 551). For example, the $V_{CE}$ may decrease from about 12 V to less than 1 V (e.g., near, or substantially at, 0 V) and then be maintained thereat. Further, the $V_{BE}$ may increase and level off at a value less than a value clamped by the Zener diode (curve 541). For example, the $V_{BE}$ may increase to about 0.7 V. Moreover, in the vehicle battery system corresponding to the depicted example, the control input of the cutoff circuit may be coupled to a collector terminal of the low-current leakage transistor, and the output of the cutoff circuit may be coupled to an emitter terminal of the low-current leakage transistor. Accordingly, the voltage difference across the control input and the output may be maintained (curve 521), e.g., less than the first threshold voltage (curve 522). For example, the voltage difference across the control input and the output may be correspondingly maintained at less than 1 V (e.g., near, or substantially at, 0 V). In this way, the protection circuit may prevent the voltage difference across the control input and the output from reaching the first threshold voltage, such that the cutoff circuit may remain in the OFF state (curve 501). Between t3 and t4, an extended time interval is indicated by a break in the abscissa during which a cause of the negative voltage at the output of the cutoff circuit, such as the reverse bias voltage condition, may end.

At t4, a second example operating sequence of the vehicle battery system may begin. Accordingly, between t4 and t5, each of the cutoff circuit state (curve 503) and the low-current leakage transistor state (curve 533) may be in the OFF state.

At t5, a switch ON request may be received by the vehicle battery system for the cutoff circuit, and a voltage may be applied to the control input of the cutoff circuit. Thus, between t5 and t6, the voltage difference across the control input of the cutoff circuit and the output of the cutoff circuit may increase (curve 523) until, at t6, the first threshold voltage is reached (curve 524) and the cutoff circuit switched from the OFF state to the ON state. The voltage difference across the control input and the output may continue to increase to a constant voltage value. Correspondingly, after t6, the voltage applied to the output of the cutoff circuit may increase to a constant (positive) voltage value (curve 513).

During the second example operating sequence, each of the $V_{BE}$ and the $V_{CE}$ of the low-current leakage transistor remain at constant voltage values near, or substantially at, 0 V (curves 543 and 553, respectively). Accordingly, the $V_{BE}$ does not reach the second threshold voltage (curve 544) during the second example operating sequence, and the low-current leakage transistor remains in the OFF state (curve 533). In this way, in some examples, the protection circuit may not be activated in response to the vehicle battery system receiving a switch ON request for the cutoff circuit.

In this way, a vehicle battery system including a battery pack coupled to a battery management system (BMS) is provided, where the BMS may include a reverse bias protection circuit for maintaining a cutoff circuit in an OFF state during application of a reverse bias voltage. In some examples, the cutoff circuit may include a metal-oxide-semiconductor field-effect transistor (MOSFET). Specifically, a gate-source voltage ($V_{GS}$) of the MOSFET may be maintained below a threshold voltage ($V_{th}$) unless a switch ON request is received at the BMS. In some examples, the MOSFET may be coupled to a low-current leakage transistor, such as a bipolar junction transistor, such that the $V_{GS}$ of the MOSFET may be maintained by a collector-emitter voltage ($V_{CE}$) of the low-current leakage transistor. A technical effect of coupling the MOSFET to the reverse bias protection circuit in this way is that the MOSFET, and thereby the vehicle battery system as a whole, may be protected from degradation during a reverse bias voltage condition. Further, the reverse bias protection circuit may be implemented without costly components, such as additional MOSFETs, or highly complex control circuits.

In one example, a vehicle battery system comprises a battery management system comprising a MOSFET, a battery pack having a plurality of stacked battery cells, a positive supply line of the battery pack being coupled to the MOSFET and a reverse bias protection circuit coupled to the MOSFET, the reverse bias protection circuit comprising a low-current leakage transistor configured to maintain a gate-source voltage ($V_{GS}$) of the MOSFET below a threshold voltage ($V_{th}$) of the MOSFET.

In another example, a vehicle battery system comprises a battery management system (BMS) comprising a cutoff circuit electrically coupled to reverse bias protection circuit, and a battery pack having a plurality of stacked battery cells, a positive supply line of the battery pack being electrically coupled to the cutoff circuit, and wherein the reverse bias protection circuit includes each of an input electrically coupled to a control input of the cutoff circuit, an output electrically coupled to an output of the cutoff circuit, and a control input electrically coupled to the output of the cutoff circuit. A first example of the vehicle battery system further includes wherein the input of the reverse bias protection circuit, the output of the reverse bias protection circuit, and the control input of the reverse bias protection circuit are included in a switchable current path of the reverse bias protection circuit, the switchable current path arranged between the control input of the cutoff circuit and the output of the cutoff circuit. A second example of the vehicle battery system, optionally including the first example of the vehicle battery system, further includes wherein the BMS is configured to flow electric current through the switchable current path upon detection of a reverse bias voltage at the output of the cutoff circuit, and wherein the BMS is further configured to prevent electric current flow through the switchable current path in response to an absence of the reverse bias voltage at the output of the cutoff circuit. A third example of the vehicle battery system, optionally including one or more of the first and second examples of the vehicle battery system, further includes wherein the reverse bias protection circuit comprises one or more diodes, the one or more diodes configured to feed the electric current to the switchable current path upon detection of the reverse bias voltage. A fourth example of the vehicle battery system, optionally including one or more of the first through third examples of the vehicle battery system, further includes wherein the input of the reverse bias protection circuit, the output of the reverse bias protection circuit, and the control input of the reverse bias protection circuit are included in a low-current leakage transistor coupled to a Zener diode, the Zener diode configured to switch ON the low-current leakage transistor by increasing a base-emitter voltage ($V_{BE}$) of the low-current leakage transistor. A fifth example of the vehicle battery system, optionally including one or more of the first through fourth examples of the vehicle battery system, further includes wherein the low-current leakage transistor and the cutoff circuit are configured such that a collector-emitter voltage ($V_{CE}$) of the low-current leakage transistor reduces a voltage across the control input of the cutoff circuit and the output of the cutoff circuit when the low-current leakage transistor is switched ON. A sixth example of the vehicle battery system, optionally including one or more of the first through fifth examples of the vehicle battery system, further includes wherein the $V_{CE}$ of the low-current leakage transistor is decreased to and maintained at less than 1 V when the low-current leakage transistor is switched ON. A seventh example of the vehicle battery system, optionally including one or more of the first through sixth examples of the vehicle battery system, further includes wherein the BMS comprises a driver integrated circuit, the driver integrated circuit electrically coupled to the reverse bias protection circuit via three pins. An eighth example of the vehicle battery system, optionally including one or more of the first through seventh examples of the vehicle battery system, further includes wherein the three pins comprise a first pin configured to switch the cutoff circuit to an ON state, a second pin configured to switch the cutoff circuit to an OFF state, and a third pin configured as a reference pin for controlling a voltage across the control input of the cutoff circuit and the output of the cutoff circuit.

In yet another example, a battery management system comprises a protection circuit comprising a low-current leakage junction transistor, and a MOSFET comprising a drain terminal, a gate terminal, and a source terminal, the drain terminal directly coupled to a positive supply line of a battery pack having a plurality of battery cells, the source terminal directly coupled to each of an electrical load and the low-current leakage junction transistor, and the gate terminal coupled to the low-current leakage junction transistor, wherein the protection circuit is configured to maintain the MOSFET in an OFF state in response to a reverse bias voltage being applied to the source terminal. A first example of the battery management system, further includes wherein the low-current leakage junction transistor comprises a collector terminal, a base terminal, and an emitter terminal, wherein the collector terminal of the low-current leakage junction transistor is coupled to the gate terminal of the MOSFET via each of a first resistor and a first diode, and wherein the emitter terminal of the low-current leakage junction transistor is directly coupled to the source terminal of the MOSFET. A second example of the battery management system, optionally including the first example of the battery management system, further includes wherein the protection circuit comprises a second diode, wherein the second diode is a Zener diode, wherein the emitter terminal is further coupled to an anode of the second diode, wherein the base terminal is coupled to a cathode of the second diode via a second resistor, and wherein the second diode is configured to switch the low-current leakage junction transistor to an ON state by increasing a base-emitter voltage ($V_{BE}$) of the low-current leakage junction transistor in response to the reverse bias voltage being applied to the source terminal. A third example of the battery management system, optionally including one or more of the first and second examples of the battery management system, further includes wherein the first diode is coupled to the collector terminal to maintain a direction of current flow to the low-current leakage junction transistor in response to the reverse bias voltage being applied to the source terminal. A fourth example of the battery management system, optionally including one or more of the first through third examples of the battery management system, further includes wherein maintaining the MOSFET in the OFF state comprises decreasing and maintaining a collector-emitter voltage ($V_{CE}$) of the low-current leakage junction transistor, the MOSFET further maintained in the OFF state by correspondingly maintaining a gate-source voltage ($V_{GS}$) of the MOSFET below a threshold voltage ($V_{th}$) of the MOSFET. A fifth example of the battery management system, optionally including one or more of the first through fourth examples of the battery management system, further includes wherein decreasing and maintaining the $V_{CE}$ of the low-current leakage junction transistor comprises decreasing the $V_{CE}$ to and maintaining the $V_{CE}$ at below 1 V. A sixth example of the battery management system, optionally including one or more of the first through fifth examples of the battery management system, further comprises a driver integrated circuit coupled to the protection circuit, wherein the driver integrated circuit is configured to switch the MOSFET to an ON state responsive to receiving a switch ON request generated via a controller coupled to the driver integrated circuit. A seventh example of the battery management system, optionally including one or more of the first through sixth examples of the battery management system, further includes wherein the driver integrated circuit comprises a first output, a second output, and a third output, where the first output is configured to pull up a voltage of the gate terminal ($V_G$), the second output is configured to pull the $V_G$ to ground, and the third output is configured to regulate a voltage of the source terminal ($V_S$). An eighth example of the battery management system, optionally including one or more of the first through seventh examples of the battery management system, further includes wherein two diodes are coupled to the first output of the driver integrated circuit to feed a current towards the gate terminal in response to the reverse bias voltage being applied to the source terminal. A ninth example of the battery management system, optionally including one or more of the first through eighth examples of the battery management system, further includes wherein a diode is coupled to the second output of the driver integrated circuit to maintain a direction of current flow to the driver integrated circuit when the $V_G$ is pulled to ground. A tenth example of the battery management system, optionally including one or more of the first through ninth examples of the battery management system, further includes wherein a diode is coupled to the third output of the driver integrated circuit to feed a current towards the source terminal in response to the reverse bias voltage being applied to the source terminal.

In yet another example, a method for managing current flow through a battery pack cutoff circuit comprises flowing a current from a first node that is coupled to a control input of the battery pack cutoff circuit to a second node that is coupled to an output of the battery pack cutoff circuit while preventing current flow across the control input to the output in response to a negative voltage being applied to the second node. A first example of the method further comprises not flowing the current from the first node to the second node in response to an absence of the negative voltage at the second node. A second example of the method, optionally including the first example of the method, further includes wherein flowing the current from the first node to the second node is enabled by activating a transistor. A third example of the method, optionally including one or more of the first and second examples of the method, further includes wherein the current flows from ground to the transistor by flowing through two diodes.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle battery system, comprising:
a battery management system (BMS) comprising a cutoff circuit electrically coupled to a reverse bias protection circuit, and a driver integrated circuit, the driver integrated circuit electrically coupled to the reverse bias protection circuit via three pins; and
a battery pack having a plurality of stacked battery cells, a positive supply line of the battery pack being electrically coupled to the cutoff circuit, wherein the reverse bias protection circuit comprises each of an input electrically coupled to a control input of the cutoff circuit, an output electrically coupled to an output of the cutoff circuit, and a control input electrically coupled to the output of the cutoff circuit;
wherein the reverse bias protection circuit is not coupled to an input of the cutoff circuit.

2. The vehicle battery system of claim 1, wherein the input of the reverse bias protection circuit, the output of the reverse bias protection circuit, and the control input of the reverse bias protection circuit are included in a switchable current path of the reverse bias protection circuit, the switchable current path arranged between the control input of the cutoff circuit and the output of the cutoff circuit.

3. The vehicle battery system of claim 2, wherein the BMS is configured to flow electric current through the switchable current path upon detection of a reverse bias voltage at the output of the cutoff circuit; and
wherein the BMS is further configured to prevent electric current flow through the switchable current path in response to an absence of the reverse bias voltage at the output of the cutoff circuit.

4. The vehicle battery system of claim 3, wherein the reverse bias protection circuit comprises one or more diodes, the one or more diodes configured to feed the electric current to the switchable current path upon detection of the reverse bias voltage.

5. The vehicle battery system of claim 1, wherein the input of the reverse bias protection circuit, the output of the reverse bias protection circuit, and the control input of the reverse bias protection circuit are included in a low-current leakage transistor coupled to a Zener diode, the Zener diode configured to switch ON the low-current leakage transistor by increasing a base-emitter voltage ($V_{BE}$) of the low-current leakage transistor.

6. The vehicle battery system of claim 5, wherein the low-current leakage transistor and the cutoff circuit are configured such that a collector-emitter voltage ($V_{CE}$) of the low-current leakage transistor reduces a voltage across the control input of the cutoff circuit and the output of the cutoff circuit when the low-current leakage transistor is switched ON.

7. The vehicle battery system of claim 6, wherein the $V_{CE}$ of the low-current leakage transistor is decreased to and maintained at less than 1 V when the low-current leakage transistor is switched ON.

8. The vehicle battery system of claim 1, wherein the three pins comprise:
a first pin configured to switch the cutoff circuit to an ON state;
a second pin configured to switch the cutoff circuit to an OFF state; and
a third pin configured as a reference pin for controlling a voltage across the control input of the cutoff circuit and the output of the cutoff circuit.

9. A vehicle battery system, comprising:
a battery management system (BMS) comprising a cutoff circuit electrically coupled to a reverse bias protection circuit; and
a battery pack having a plurality of stacked battery cells, a positive supply line of the battery pack being electrically coupled to the cutoff circuit, wherein the reverse bias protection circuit comprises each of an input electrically coupled to a control input of the cutoff circuit, an output electrically coupled to an output of the cutoff circuit, and a control input electrically coupled to the output of the cutoff circuit;
wherein the input of the reverse bias protection circuit, the output of the reverse bias protection circuit, and the control input of the reverse bias protection circuit are included in a low-current leakage transistor coupled to a Zener diode, the Zener diode configured to switch ON the low-current leakage transistor by increasing a base-emitter voltage ($V_{BE}$) of the low-current leakage transistor.

10. The vehicle battery system of claim 9, wherein the low-current leakage transistor and the cutoff circuit are configured such that a collector-emitter voltage ($V_{CE}$) of the low-current leakage transistor reduces a voltage across the control input of the cutoff circuit and the output of the cutoff circuit when the low-current leakage transistor is switched ON.

11. The vehicle battery system of claim 10, wherein the $V_{CE}$ of the low-current leakage transistor is decreased to and maintained at less than 1 V when the low-current leakage transistor is switched ON.

* * * * *